(12) United States Patent
Hofmann et al.

(10) Patent No.: US 11,854,125 B2
(45) Date of Patent: Dec. 26, 2023

(54) METHOD AND APPARATUS FOR PROVIDING AN ARTIFACT-REDUCED X-RAY IMAGE DATASET

(71) Applicant: Siemens Healthcare GmbH, Erlangen (DE)

(72) Inventors: Christian Hofmann, Erlangen (DE); Matthias Baer-Beck, Spardorf (DE)

(73) Assignee: SIEMENS HEALTHCARE GMBH, Erlangen (DE)

(*) Notice: Subject to any disclaimer, the term of this patent is extended or adjusted under 35 U.S.C. 154(b) by 317 days.

(21) Appl. No.: 17/200,999

(22) Filed: Mar. 15, 2021

(65) Prior Publication Data

US 2021/0304461 A1 Sep. 30, 2021

(30) Foreign Application Priority Data

Mar. 24, 2020 (DE) ...................... 10 2020 203 741.8

(51) Int. Cl.
*G06T 11/00* (2006.01)
*G06T 7/11* (2017.01)

(52) U.S. Cl.
CPC .............. *G06T 11/008* (2013.01); *G06T 7/11* (2017.01); *G06T 2207/10081* (2013.01); *G06T 2207/20081* (2013.01)

(58) Field of Classification Search
CPC ......... G06T 11/00; G06T 11/008; G06T 5/00; G06T 7/11; G06T 2207/10081;
(Continued)

(56) References Cited

U.S. PATENT DOCUMENTS 6,735,273 B2 * 5/2004 Flohr .................... A61B 6/032
378/158
8,233,586 B1 7/2012 Boas
(Continued)

FOREIGN PATENT DOCUMENTS

DE 102008045449 B4 3/2016
GB 2548303 B 2/2018
WO WO-2009004571 A1 * 1/2009 ........... G06T 11/006

OTHER PUBLICATIONS

Tuy, Heang K.; "A post-processing algorithm to reduce metallic clip artifacts in CT images"; European Radiology; vol. 3; pp. 129-134; 1993.

*Primary Examiner* — Edward F Urban
*Assistant Examiner* — Benedict E Lee
(74) *Attorney, Agent, or Firm* — Harness, Dickey & Pierce, P.L.C.

(57) ABSTRACT

A method is for providing a second artifact-reduced x-ray image dataset based on an artifact-affected x-ray image dataset of an examination object, the artifact being caused by an object at least one of on, outside of and within the examination object. In an embodiment, the method includes creating a first artifact-reduced x-ray image dataset based on the artifact-affected x-ray image dataset, based on which a second projection dataset is created; identifying an object area which maps the object in the at least one projection; creating a third projection dataset based on the first projection dataset; and crating the second artifact-reduced x-ray image dataset based on the third projection dataset, through which the second artifact-reduced x-ray image dataset is provided.

19 Claims, 6 Drawing Sheets

(58) Field of Classification Search
CPC . G06T 2207/20081; G06T 2207/20221; G06T 5/005; G06T 5/50; G06T 2207/30004
See application file for complete search history.

(56) References Cited

U.S. PATENT DOCUMENTS

| | | | |
|---|---|---|---|
| 9,875,558 B2* | 1/2018 | Yang | G06T 11/003 |
| 2010/0054569 A1 | 3/2010 | Bruder et al. | |
| 2013/0077847 A1* | 3/2013 | Hansis | G06T 11/006 |
| | | | 382/131 |
| 2017/0301066 A1* | 10/2017 | Wang | G06T 11/008 |
| 2020/0226800 A1* | 7/2020 | Yoon | A61B 6/032 |
| 2021/0056688 A1* | 2/2021 | Xu | G06T 11/008 |

* cited by examiner

METHOD AND APPARATUS FOR PROVIDING AN ARTIFACT-REDUCED X-RAY IMAGE DATASET

PRIORITY STATEMENT

The present application hereby claims priority under 35 U.S.C. § 119 to German patent application number DE 102020203741.8 filed Mar. 24, 2020, the entire contents of which are hereby incorporated herein by reference.

FIELD

Example embodiments of the invention generally relate to a method and an apparatus for providing a second, artifact-reduced x-ray image dataset based on an artifact-affected x-ray image dataset of an examination object, wherein the artifact is caused by an object in the examination object; to a medical imaging device; to a computer program product; and to a computer-readable storage medium.

BACKGROUND

In everyday clinical practice medical imaging devices are used above all for medical diagnostics. This includes the use of a computed tomography device for example. In a computed tomography device (CT device), for recording spatially three-dimensional image data, a radiation source, for example an x-ray radiation source, and also a detector apparatus operating in conjunction therewith, rotate about an examination object to be examined, for example a patient. During the rotational movement measurement data is recorded within an angle sector. The projection measurement data involves a plurality of projections that contain information about the attenuation of the radiation by the examination object from different projection angles. A two-dimensional cross-sectional image or cross-sectional images or a three-dimensional volume image of the examination object can be computed from these projections, via what is known as filtered back projection for example.

If objects, which strongly absorb x-rays, for example objects that contain metal, are present in a recording area for a computed tomography image dataset, these can lead to artifacts in the computed tomography image dataset. There are a plurality of artifact correction algorithms that are used in everyday clinical practice to correct or to reduce such artifacts.

In cases in which an artifact is caused by very small metal objects or heavily asymmetrical objects in the body of a patient, conventional algorithms can frequently only lead to an improved result to a limited extent, since these are mostly designed to compensate for stronger artifacts, or do not react to the objects at all. Moreover such as a rule complex artifact correction algorithms generally require a considerable outlay in time.

A practical application case for medical procedures such as vertebroplasties, biopsies, ablations, drainages etc. can comprise needles or cannulas introduced into a patient. In such cases it is usual in these medical applications for the procedure and the position of the introduced object in the patient at the time to be checked repeatedly via an imaging device, for example by a CT device.

Further examples of applications can comprise imaging of an examination object, wherein the imaged examination area of the patient comprises wire markings for marking a tumor position, a fixing of a bone, via a screw introduced into the patient for example, or metallic electrodes introduced into the patient, for example as part of a deep brain stimulation. Other examples can also comprise heavily absorbent, in particular metallic, objects on or in the examination object.

SUMMARY

At least one embodiment of the present application provides an improved method and/or an improved apparatus for providing an artifact-reduced x-ray image dataset.

Further forms of embodiment and developments of the invention that are advantageous and in part inventive per se are set out in the claims and in the description given below.

At least one embodiment of the invention relates to a method for providing a second, artifact-reduced x-ray image dataset based on an artifact-affected x-ray image dataset of an examination object, wherein the artifact is caused by an object at least one of on, outside of and within the examination object, comprising:

provision of the artifact-affected x-ray image dataset, based on which a first projection dataset comprising a plurality of projections is created, or provision of a first projection dataset comprising a plurality of projections, based on which the artifact-affected x-ray image dataset is created, first creation of a first artifact-reduced x-ray image dataset based on the artifact-affected x-ray image dataset, based on which a second projection dataset is created, identification of an object area in at least one projection of the first projection dataset, which maps the object in the at least one projection, second creation of a third projection dataset based on the first projection dataset, wherein a projection value in the identified object area is adapted based on a projection value of the second projection dataset and as a function of a measure of the influence by the artifact on the projection value; and third creation of the second, artifact-reduced x-ray image dataset based on the third projection dataset, through which the second, artifact-reduced x-ray image dataset is provided.

At least one embodiment of the invention also relates to a processing unit for providing a second artifact-reduced x-ray image dataset based on an artifact-affected x-ray image dataset of an examination object, wherein the artifact is caused by an object at least one of on, outside of and within the examination object, having an interface and a computing unit.

At least one embodiment of the invention further relates to a medical imaging device comprising a processing unit for providing a second artifact-reduced x-ray image dataset. In this case the medical imaging device is advantageously embodied for carrying out a form of embodiment of the proposed method for providing a second artifact-reduced x-ray image dataset. The advantages of the proposed medical imaging device essentially correspond to the advantages of the proposed method for providing a second, artifact-reduced x-ray image dataset. Features, advantages or alternate forms of embodiment mentioned here can likewise also be transferred to the medical device and vice versa.

At least one embodiment of the invention also relates to a computer program product with a computer program, which is able to be loaded directly into a memory of a processing unit, with program sections for carrying out all steps of the method of an embodiment for provision of a second artifact-reduced x-ray image dataset or its aspects when the program sections are executed by the processing unit.

At least one embodiment of the invention also relates to a computer-readable storage medium, on which program sections able to be read and executed by a processing unit are stored, for carrying out all steps of the method of an embodiment for providing a second artifact-reduced x-ray image dataset or its aspects when the program sections are executed by the processing unit.

At least one embodiment of the invention also relates to a method for providing a second artifact-reduced x-ray image dataset based on an artifact-affected x-ray image dataset of an examination object, wherein an artifact is caused by an object at least one of on, outside of and within the examination object, the method comprising:

provisioning the artifact-affected x-ray image dataset and creating a first projection dataset, including a plurality of projections, based upon the artifact-affected x-ray image dataset, or a first projection dataset including a plurality of projections, and creating the artifact-affected x-ray image dataset based upon the first projection dataset;

creating a first artifact-reduced x-ray image dataset based on the artifact-affected x-ray image dataset, and creating a second projection dataset based upon the first artifact-reduced x-ray image dataset;

identifying an object area, in at least one projection of the first projection dataset, which maps the object in the at least one projection;

creating a third projection dataset based on the first projection dataset, a projection value in the identified object area being adapted based on a projection value of the second projection dataset and as a function of a measure of influencing of the projection value by the artifact; and creating the second artifact-reduced x-ray image dataset based on the third projection dataset, the second artifact-reduced x-ray image dataset being provided through the second artifact-reduced x-ray image dataset.

At least one embodiment of the invention also relates to a processing unit for providing a second, artifact-reduced x-ray image dataset based on an artifact-affected x-ray image dataset of an examination object, the artifact being caused by an object at least one of on, outside of and within the examination object, the processing unit comprising:

an interface embodied to provide the artifact-affected x-ray image dataset or a first projection dataset including a plurality of projections; and at least one processor embodied to create a first projection dataset including a plurality of projections based on the artifact-affected x-ray image dataset provided or create the artifact-affected x-ray image dataset based on the first projection dataset provided, create a first artifact-reduced x-ray image dataset based on the artifact-affected x-ray image dataset, create a second projection dataset based on the first artifact-reduced x-ray image dataset, identify an object area in at least one projection of the plurality of projections of the first projection dataset, which maps the object in the at least one projection, create a third projection dataset based on the first projection dataset, a projection value in the identified object area of the at least one projection being adapted based on a projection value of the second projection dataset and as a function of a measure of influencing by the artifact, and create the second, artifact-reduced x-ray image dataset based on the third projection dataset, the interface being further embodied to provide the second artifact-reduced x-ray image dataset.

At least one embodiment of the invention also relates to a medical imaging device comprising the processing unit of an embodiment.

At least one embodiment of the invention also relates to a non-transitory computer program product storing a computer program, directly loadable into a memory unit of a processor, including program sections for carrying out the method of an embodiment when the program sections are executed by the processor.

At least one embodiment of the invention also relates to a non-transitory computer-readable storage medium, storing program sections readable and executable by a processor, to carry out the method of an embodiment when the program sections are executed by the processor.

BRIEF DESCRIPTION OF THE DRAWINGS

The invention will be explained below with the aid of examples of forms of embodiment, which refer to the enclosed figures. The diagrams in the figures are schematic, greatly simplified and not necessarily true-to-scale. In the figures.

DETAILED DESCRIPTION OF THE EXAMPLE EMBODIMENTS

Figure 1:
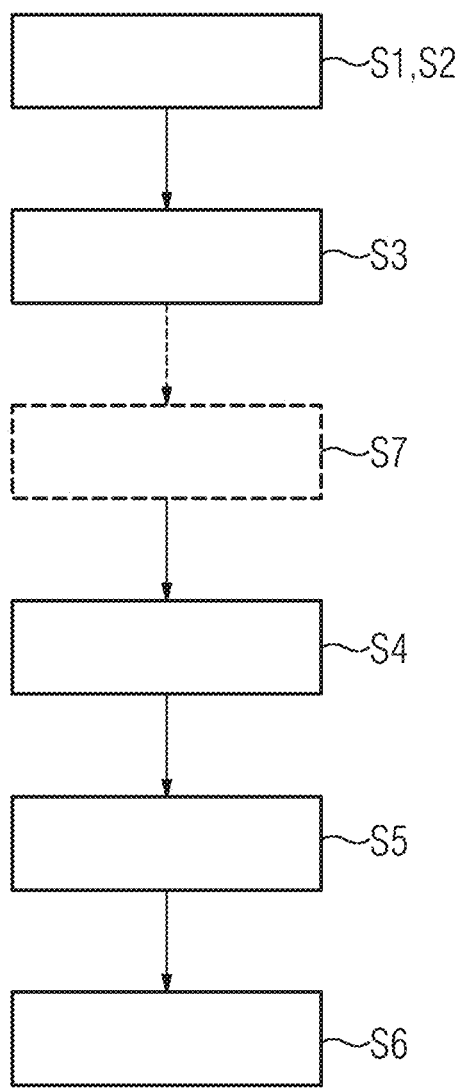
FIG. 1 shows a schematic sequence of a method for providing a second artifact-reduced x-ray image dataset.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a method for providing a second, artifact-reduced x-ray image dataset based on an artifact-affected x-ray image dataset of an examination object, wherein the artifact is caused by an object at least one of on, outside of and within the examination object, comprising:

provision of the artifact-affected x-ray image dataset, based on which a first projection dataset comprising a plurality of projections is created, or provision of a first projection dataset comprising a plurality of projections, based on which the artifact-affected x-ray image dataset is created, first creation of a first artifact-reduced x-ray image dataset based on the artifact-affected x-ray image dataset, based on which a second projection dataset is created, identification of an object area in at least one projection of the first projection dataset, which maps the object in the at least one projection, second creation of a third projection dataset based on the first projection dataset, wherein a projection value in the identified object area is adapted based on a projection value of the second projection dataset and as a function of a measure of the influence by the artifact on the projection value; and third creation of the second, artifact-reduced x-ray image dataset based on the third projection dataset, through which the second, artifact-reduced x-ray image dataset is provided.

By way of an x-ray image dataset at least one examination area of the examination object can further be mapped. An examination area in this case can comprise an anatomical and/or spatial area of the examination object, which features a pre-specified tissue area and/or a spatial area of a planned intervention. The examination object can comprise a human or an animal patient.

An x-ray image dataset in at least one embodiment of the inventive method can be based in particular on a plurality of projections recorded from different projection directions. A projection of the plurality can correspond in each case to an irradiation of the examination object with x-rays from one projection direction. This means that a projection can map the examination object or the area of an examination object irradiated in each case with x-rays from the respective projection direction. A projection then as a rule comprises a plurality of projection values for a spatially resolved imaging within one projection. The projection values can be based on the signals measured in a respective detector cell, also called a detector element or detector pixel, of an x-ray detector used for the recording of the image data during the irradiation of the examination object with x-rays.

The x-ray image dataset can in particular comprise three-dimensional medical image data of the examination object. In such cases the x-ray image dataset can further comprise a number of items of two-dimensional image data, also called slice images, which each map a slice of the examination object at an axial position along an axis at right angles to the projection directions. Advantageously three-dimensional image data comprises a number of voxels, in particular picture elements. In such data each voxel can preferably have a value in each case, in particular an image value, for example a gray value and/or an RGB color value and/or an intensity value. In a similar way two-dimensional image data can comprise a number of pixels, in particular picture elements. In such cases each pixel can preferably have a value in each case, in particular an image value, for example a gray value and/or an RGB color value and/or an intensity value.

An x-ray image dataset can be reconstructed from a projection dataset via a reconstruction algorithm, for example a filtered back projection or another type of algorithm. Moreover a projection dataset comprising a plurality of projections can also be created from a reconstructed x-ray image dataset. For example a forward projection can be applied to an x-ray image dataset, in order to create and provide a projection dataset.

The artifact-affected x-ray image dataset can be created based on the first projection dataset provided. For example a corresponding x-ray image dataset can be determined from a projection dataset via a reconstruction algorithm. The method can also comprise proving the artifact-affected x-ray image dataset of the examination object. Based on the artifact-affected x-ray image dataset the first projection dataset can subsequently be created and thus provided. The first projection dataset, on which the artifact-affected x-ray image dataset is based or which has been created based on this, can also be referred to as the artifact-affected projection dataset.

In this case the projection datasets used within the framework of the proposed method preferably comprise projections from the same projection directions in each case, i.e. the projection datasets each comprise corresponding projections from corresponding projection directions.

The artifact-affected x-ray image dataset or a projection dataset on which this is based can be recorded and/or provided via a medical imaging device from the examination area of the examination object. The medical imaging device for recording the x-ray image dataset can be embodied for example as a medical x-ray device, in particular as a C-arm x-ray device and/or Dyna-CT, and/or computed tomography system (CT). The artifact-affected x-ray image dataset or a projection dataset on which this is based can be provided by a processing unit of a medical imaging device for recording the x-ray image dataset. A provision can also comprise an acquisition and/or reading out of a computer-readable data memory and/or receiving data from a data memory unit, for example a database.

The artifact caused by the object can in particular be based on an effect of beam hardening or scattering at the object. When the text below talks about an artifact influence or an influencing of the projection value by the artifact, this in particular includes the projection value being affected by a physical effect underlying the artifact, for example beam hardening or scattering. In particular the influence of such an effect can increase with an increasing irradiation length of the x-rays through the object during the irradiation of the examination object. This means that with a small irradiation length of the object with x-rays less of an effect and thereby less of an artifact influence, in particular on a projection value determined, is to be expected than with a longer irradiation length. The influence can also depend on the material of the object. With a more strongly absorbent material with a high coefficient of absorption for x-ray radiation, less of an effect and thereby less of an artifact influence, in particular on a projection value determined, is to be expected than with a lower coefficient of absorption.

The object can in particular comprise a strongly absorbent material, which has a similar or in particular higher coefficient of absorption for x-ray radiation than bone for example. In particular the object can comprise a metallic material.

An object at least one of on, outside of and within the examination object in this case in particular includes an object that is introduced into the examination object, i.e. is present within an examination object, or which is arranged at or on, but outside of, the examination object.

For the first creation of the first artifact-reduced x-ray image dataset at least one requirement can be set, that the created first, artifact-reduced x-ray image dataset and thus also the projection dataset and the projection values that it comprises is as free as possible from the artifact caused by the object. The first artifact-reduced x-ray image dataset can preferably be free from the artifact. The first artifact-reduced x-ray image dataset can at least have the artifact reduced by comparison with the artifact-affected x-ray image dataset. The created first artifact-reduced x-ray image dataset can for example be based on a material decomposition of the artifact-affected x-ray image dataset. The first artifact-reduced x-ray image dataset can be the result of an artifact correction algorithm, which is designed to reduce an artifact, in particular a hardening or radiation scatter artifact in an x-ray image dataset, caused by a strongly-absorbent object.

An object area can be identified in at least one, i.e. also in a majority of the plurality on or in all projections of the plurality of projections of the first projection dataset. The Identification can comprise, at least in that projection of the first projection dataset, which images the greatest irradiation length through the object, an object area mapping the object in this projection being identified. In particular with a heavily asymmetrical object, of which the definitive extent largely overlaps with a projection direction of the majority of projection directions, a correction at least in the projection which features the greatest irradiation length can already make possible an advantageous improvement. The identification can likewise comprise, in each projection that images the object, of the object area being identified which maps the object in the respective projections. The object area of a projection comprises at least those projection values of the projection that map the object spatially resolved in the projection. In particular the identification of an object area can comprise a projection value in a projection being assigned to the object or being identified as comprised by the object area.

The identification of the object area can be based on a projection value or on a parameter derived from the artifact-affected or artifact-reduced x-ray image dataset. The identification can be based on a segmentation of the object in the artifact-affected or artifact-reduced x-ray image dataset or on a parameter derived therefrom.

Based on the identified object area in the at least one projection or the respective identified object areas in the number of projections of the first projection dataset, a projection value in the object area or projection values in the object areas of the artifact-affected projection dataset can be adapted. This also comprises a projection value being replaced by an adapted projection value. The adapted projection value can in particular correspond to a corrected projection value, which is affected to a lesser extent by an effect caused by the artifact, i.e. is influenced by the artifact to a lesser extent. In particular the adapted projection value can be adapted in such a way that the artifact caused by the object occurs at least in a reduced manner in an x-ray image dataset created based on the third projection dataset.

In particular basing the adapted projection value on a projection value of the second projection dataset ($PD_{prior}$) is dependent on a measure of the influencing by the artifact of the projection values to be adapted. In particular the adapted projection value can be based on the projection value of the projection value of the artifact-reduced projection dataset corresponding to the location of the artifact-affected projection dataset. In particular the adapted projection value can be based on the projection value to be adapted of the first projection dataset and a projection value of the second projection dataset. In particular a gradual adaptation of the projection value to be adapted can be based on the location of the projection value of the artifact-reduced projection dataset corresponding to its location, wherein the gradual adaptation is dependent on the measure of the influencing of the projection value to be adapted by the artifact. For example a projection value can then be adapted in particular based on the artifact-reduced projection value if the projection value to be replaced is influenced by the artifact. For example a projection value that has no influence or only a slight influence of an artifact does not have to be adapted or only has be adapted to a lesser extent.

The measure can be based on a projection value or on a parameter derived from the artifact-affected or artifact-reduced x-ray image dataset. A measure can for example be based on an irradiation length of the object during irradiation of the examination object from the projection direction of the projection considered.

The adaptation can comprise a multiplication, division, subtraction or summation or the application of another type of mathematical functional relationship based on the projection values. It can comprise the derivation of a correction factor based on the projection values and the application of the correction factor to the projection value to be replaced.

In particular the replacement can be based on replacing a weighted combination of the projection value to be adapted of the artifact-affected projection dataset and the projection value corresponding to its location of the artifact-reduced projection dataset. In this case the weighting can depend for example on the measure of the influencing of projection value by the artifact.

The creation of the second, artifact-reduced x-ray image dataset based on the third projection dataset can comprise a reconstruction with a reconstruction algorithm based on the second artifact-reduced x-ray image dataset. For example the creation comprises the application of a filtered back projection. It can however also comprise other processing steps based on the third projection dataset. The creation of the second artifact-reduced x-ray image dataset then enables the second artifact-reduced x-ray image dataset to be provided.

The method advantageously allows a targeted correction of projections or projection values that map the object, and advantageously makes possible a provision of an artifact-reduced x-ray image dataset. In this case intervention into the measured or provided data is minimized, so that only where an artifact influence is to be found does an adaptation take place and "good", uninfluenced data can be retained where possible. The method in particular enables it to be made possible for only those projections or projection values to be adapted or corrected that make a great contribution to the artifact, while non-influenced projection values have to be adapted in a reduced form or not at all. This can advantageously correspond to an efficient correction in terms of time. Likewise the disadvantages of alternative corrections, which frequently lead to an inferior image sharpness or other types of inferior image quality, can be avoided by this.

This can in particular be especially advantageous when for example, through the presence of a strongly asymmetrical or small object at least one of on, outside of and within the examination object, only a few projections or projection values in a projection are influenced by the artifact, while other projections or projection values are not influenced or are only influenced slightly and there is thus no need for an adaptation.

In accordance with one embodiment variant of the proposed method the first creation of the first, artifact-reduced x-ray image dataset can comprise the use of an artifact-correction algorithm or a material decomposition based on the artifact-affected x-ray image dataset.

The artifact-reduced x-ray image dataset can be based on a material decomposition of the artifact-affected x-ray image dataset. A simple implementation in this case can comprise a threshold value-based material decomposition based on the image values of the artifact-affected x-ray image dataset. For example a decomposition into three materials contained in the image dataset can be provided, e.g. into air, tissue and object. A simple distinction can be provided by a comparison between the threshold values assigned to the materials and the measured image values. Other methods can also be used or can support a material decomposition. A material decomposition can also comprise a segmentation algorithm. A segmentation, along with a threshold value-based method, can also comprise another type of segmentation method. A segmentation can be obtained on the basis of pixels, voxels, edges, surfaces and/or regions. The segmentation can also be based on a model-based method, wherein assumptions about the object to be segmented or the image areas to be distinguished are included. In such cases the step of segmenting can also comprise starting points or germ cells or an item of rough contour information for the segmentation set manually by a user. A reduced-reduced x-ray image dataset based on a material decomposition can in particular make possible an efficient creation of the artifact-reduced x-ray image dataset in terms of time.

An artifact correction algorithm can in particular comprise a metal artifact correction algorithm. The artifact correction algorithm can in particular be designed to reduce the artifact in the artifact-affected x-ray image dataset. The artifact correction algorithm can be an algorithm for correction of a hardening effect or a radiation scattering effect. Such an artifact correction algorithm can for example identify artifact components in the sinogram data of the artifact-affected x-ray image dataset and replace them with interpolated or estimated sinogram components. For example a method as described in DE 102008045449 B4, the entire contents of which are hereby incorporated herein by reference, can be used. There are also a plurality of generally known correction algorithms, which can reduce an artifact in an x-ray image dataset and can be used for the method. In such cases the major requirement can be that the x-ray image dataset after application of the correction algorithm is as free as possible from the artifact caused by the object. Preferably the correction algorithm used continues to be a correction algorithm that works efficiently in terms of time, so that time delays can be largely avoided.

Advantageously an artifact-reduced projection dataset comprising artifact-reduced projection values can be provided for the replacement. Advantageously projection values can be made available that are preferably artifact-free and can be used for a targeted replacement or adaptation.

In a development of the proposed method the identification of the object area can be based on the application of a trained function.

A trained function can preferably be realized by way of an artificial intelligence system, i.e. by a method of machine learning. An identification of the object area based on a trained function enables all relevant influencing variables for the identification to be taken into account in an improved manner, even those for which a user cannot estimate any relationship. An artificial intelligence system can be referred to as a system for the artificial generation of knowledge from experience. An artificial system learns from examples in a training phase and can generalize after the training phase has ended. After the training phase the optimized, i.e. trained, algorithm can for example identify an object area based on a previously unknown artifact-affected x-ray image dataset or projection dataset. In particular, via a trained function based on an artificial intelligence system, after the training phase an identification can be made possible reliably, with efficient timing and exactly.

A trained function in particular maps input data to output data. The output data here can in particular continue to depend on one or more parameters of the trained function. The one or more parameters of the trained function can be determined and/or adapted by training. The determination and/or the adaptation of the one or more parameters of the trained function can be based in particular on a pair of training input data and associated comparison output data, i.e. linked thereto, wherein the trained function is applied to the training output data for creating training output data. In particular the determination and/or the adaptation can be based on a comparison of the training output data and the training comparison data. In general a trained function can also be referred to as a trainable function, i.e. a function with one or more not yet adapted parameters.

Other terms for trained function are trained mapping specification, mapping specification with trained parameters, function with trained parameters, algorithm based on artificial intelligence, machine learning algorithm. An example of a trained function is an artificial neural network, wherein the edge weights of the artificial neural network correspond to the parameters of the trained function. Instead of the term "neural network" the term "neural net" can also be used. In particular a trained function can also be a deep neural network or deep artificial neural network. A further example of a trained function is a Support Vector Machine, other machine learning algorithms in particular also continue to able to be used as a trained function.

In an embodiment variant of the proposed method, the method can comprise the step of determining an object image dataset, which essentially comprises only the image information of the object, wherein the object image dataset is created based on the artifact-affected x-ray image dataset or the first, artifact-reduced x-ray image dataset. In the step of identification the object area can then be identified by way of the object image dataset.

Based on an object image dataset, which essentially maps only the object, an image area that maps the object can be identified especially advantageously. For example, based on such an object image dataset, a mask or similar that can be applied to the artifact-affected x-ray image dataset or the projections of the first projection dataset can be derived for the step of identification.

For example an object projection dataset can be created based on the object image dataset. The object projection dataset can essentially just have projection values in the areas that map the object in the projections of the object-projection dataset. Advantageously a respective object area in a projection of the object projection dataset can be easily identified by this and the information can be transferred to the artifact-affected x-ray image dataset or to the projections of the first projection dataset.

Furthermore a measure of the expected artifact influence by the object can be derived in a simpler way from such a created object image dataset. For example an irradiation length of the object or a parameter resulting therefrom can be determined more easily and thus a measure of the influencing of a projection value by the artifact can be derived. In this way for example a projection value occurring in the object projection dataset as an extreme can indicate the maximum irradiation length occurring in the dataset. For example the respective projection values occurring in the object projection dataset can at least be brought into a relative relationship by a comparison with the projection value occurring as an extreme, from which a relative measure of an artifact influence of a respective projection value within a projection can be derived.

Especially advantageous for the method in this case is as exact as possible a localization of the object in the x-ray image dataset, in order to make possible an as exact as possible identification of an object area and a targeted and correct adaptation of a projection value.

The object image dataset can be created from the artifact-affected or from the artifact-reduced x-ray image dataset. In such a case however, in particular when an artifact correction algorithm is applied for creation of the artifact-reduced x-ray image dataset, it is preferred however not necessarily to refer back to the artifact-affected x-ray image dataset. An application of an artifact correction algorithm can result in the artifact-reduced x-ray image dataset and the artifact-affected x-ray image dataset differing from one another in such a way that an object area extracted from them does not completely match. If the object image dataset is based on an artifact-reduced x-ray image dataset based on a material decomposition the artifact-reduced x-ray image dataset can in particular represent a preliminary stage for the object image dataset.

In particular the determination of the object image dataset can comprise the object being segmented in the first artifact-reduced x-ray image dataset or in the artifact-affected x-ray image dataset.

A segmentation can be based on a threshold value-based method, i.e. on a comparison of an image value in the x-ray image dataset with one or more predetermined threshold values. As well as a threshold value-based method, a segmentation can comprise another type of segmentation method. A segmentation can be obtained based on pixels, voxels, edges, surfaces and/or regions. The segmentation can be based on a model-based method, wherein assumptions about the object to be segmented or the image areas to be distinguished are included. In such cases the step of segmenting can for example also comprise starting points or germ cells or contour information for the segmentation being set manually by a user.

A segmentation can in particular comprise the application of a trained function. A segmentation based on a trained function enables all relevant influencing variables for the segmentation to be taken into account in an improved manner, i.e. those for which a user cannot estimate any relationship for segmentation. After the training phase the optimized, i.e. trained, algorithm for example based on a previously unknown artifact-affected x-ray image dataset can segment an object. In particular via a trained function based on an artificial intelligence system after the training phase a segmentation can be made possible reliably, with efficient timing and exactly.

Furthermore, in a development of the proposed method, an expected object position of the object at least one of on, outside of and within the examination object can be included in the segmentation.

Advantageously an especially exact segmentation of the object can be made possible and thus an especially exact identification of an object area in the at least one projection of the first projection dataset.

An expected object position can be an object position planned in advance of the recording of the artifact-affected x-ray image dataset. This can be a planned object path, for example a planned guide path of an intervention needle or canula for example. An expected object position can moreover also be a position extracted from a previous x-ray image recording. An expected position can also be from other information, for example in a patient file, which for example holds type and position information about an implant, of a screw for example.

The expected object position can be included in the segmentation, by an image environment for the segmentation being limited to an environment of the expected object position.

The expected object position can be included in the segmentation by the position functioning as an input parameter for a trained function. For example a trained function can be applied to the artifact-affected x-ray image dataset in combination with the information about a planned object position. The output of the trained function can then be the segmented object.

In accordance with a method variant, in the step of second creation, the projection value in the identified object area of the at least one projection of the first projection dataset is replaced by a weighted combination of the projection value to be adapted and a projection value, in particular of the projection value corresponding in location thereto, of the second projection dataset. In this case the weights for the weighted combination are dependent on the measure of the influencing by the artifact.

By way of a weighted combination, advantageously in a simple way based on the weights used, the replacement of the projection values can be controlled in a targeted manner and depending on projection value. A weighted combination moreover represents an advantageous implementation of the adaptation with efficient timing.

For example, depending on the expected artifact influence, a projection value based on the projection value of the artifact-reduced projection dataset based on the weights used can be gradually adapted and thus corrected. In particular, where an increased artifact influence is to be expected, the projection value of the second projection dataset can be weighted more heavily than the projection value of the first projection dataset and vice versa. In particular, where no artifact influence is to be expected, there can be no adaptation and there can be recourse to the projection value of the first projection dataset. In particular, with an increasing artifact influence, an adaptation of the projection value to be adapted based on the projection value of the artifact-reduced projection dataset can be increasingly achieved.

Furthermore, in an embodiment variant of the proposed method, the weights for the weighted combination can be dependent on an irradiation length of the object during irradiation of the examination object from the projection direction of the projection considered.

The influence of artifact-creating physical effects can increase with an increasing irradiation length through the object. In particular with a short irradiation length a smaller influence can be expected and with a maximum irradiation length a maximum influence.

Advantageously a parameter based on the irradiation length can make possible a suitable weighting and thus a suitable replacement within the framework of the proposed method. In particular where an artifact is increasingly to be expected due to a longer irradiation length, the projection value of the second projection dataset can be more heavily weighted than the projection value of the first projection dataset and vice versa. Advantageously a corrected projection value can be provided in a suitable way and only where an adaptation is necessary.

An irradiation length or weights that take account of the irradiation length of the object can be determined in an advantageous way based on an object image dataset, which essentially comprises only the image information of the object. Such an object image dataset can be created in a similar way to the object image dataset previously described. An object image dataset used for the determination of weights can in particular correspond in method variants to the previously described object image dataset.

In preferred variants of the method, the method comprises the creation of an object image dataset, wherein the weights for the weighted combination are determined based on the object image dataset. An object projection dataset can be created for example from an object image dataset. A projection of the object projection dataset preferably only has projection values at places that map the object and thus are included in the object area. In particular the projection values in the object projection dataset can be dependent on the irradiation length of the object from a respective projection direction. This advantageously enables weights to be derived in a simple way as a function of the irradiation length.

In accordance with an embodiment variant of the proposed method, in the step of third creation, based on the third projection dataset and the first projection dataset, an artifact image dataset can be created, which only comprises artifact components, and wherein the artifact image dataset is applied to the artifact-affected x-ray image dataset for the creation of the second, artifact-reduced x-ray image dataset.

An artifact image dataset can be based on a difference projection dataset for example, which is based on a difference of the projection values of the respective projections of the corrected, third projection dataset and of the artifact-affected first projection dataset. After such a difference essentially only those components are left which are contained as a result of artifacts in the artifact-affected projection dataset. Based on the difference projection an artifact image dataset can be created via a reconstruction, for example comprising a filtered back projection.

An application of the artifact image dataset to the artifact-affected x-ray image dataset can for example comprise a subtraction of the artifact image dataset from the artifact-affected x-ray image dataset. It can also comprise a weighted combination, a multiplication, a division or the use of another type of functional mathematical relationship.

Advantageously the creation and use of the artifact image dataset allows expanded adaptation and correction options, for example by way of scaling and filter options or through the use of more complex functional relationships, and thus a finer tuning of the artifact correction.

Moreover in an embodiment variant of the proposed method, the artifact image dataset can be applied such that it is scaled by way of a scaling factor to the artifact-affected x-ray image dataset.

The scaling factor can advantageously provide an adaptable strength of correction. The strength can in particular also be set or adapted retrospectively and for example interactively by a user. For example, depending on the scaling factor, the artifact image dataset can merely be applied in part to the artifact-affected x-ray image dataset. The scaling factor can for example assume a value of between 0 and 1. For example a value of 0 can correspond to no correction of the artifact-affected x-ray image dataset and a value of 1 to a maximum correction. There can also be other implementations however.

As an alternative or in addition the artifact image dataset can be applied such that it is filtered via an image filter to the artifact-affected x-ray image dataset.

The image filter can in particular comprise a smoothing filter. An image filter can comprise a lowpass filter, a Gaussian filter or a median filter for example. Linear or also non-linear image filters can be used. Preferably the image filter in this case has a lowpass characteristic.

Advantageously the application of an image filter can guarantee in an improved way that no additional artifacts are induced by the proposed method. Such artifacts can be caused for example by a sampling artifact through the application of a forward projection to create a projection dataset from an x-ray image dataset. Advantageously an improved image quality can be obtained.

In accordance with an embodiment variant of the proposed method the object can be an asymmetrical object, which has a maximum longitudinal extent and a small transverse extent in relation thereto, wherein the maximum transverse extent comprises a maximum of 30% of the longitudinal extent, and wherein the object in examination object is arranged in such a way that a large part of the longitudinal extent of the object overlaps with the projection direction of the at least one projection.

For example the object can comprise a needle-like object or a canula introduced into a patient during an intervention. The object can also for example comprise a fixing screw, for fixing a bone fracture for example. The object can for example be a marking wire of a tumor marking or an electrode for a nerve stimulation.

The inventors have recognized that, in particular with strongly asymmetrical objects, the proposed method can be used to particular advantage. In this case in particular just a few projections or projection values, and indeed those with a large overlap of the irradiation length with the longitudinal extent of the object, can be influenced by artifacts caused by the object, for example a hardening artifact, while other projections or projection values are essentially not influenced, since these only have a shorter irradiation length of the object. Depending on the expected influence, by an adaptation of the projection values being implemented in a gradual and targeted manner, a correction can be made possible efficiently in terms of time and with the smallest possible intervention into the existing data.

At least one embodiment of the invention also relates to a processing unit for providing a second artifact-reduced x-ray image dataset based on an artifact-affected x-ray image dataset of an examination object, wherein the artifact is caused by an object at least one of on, outside of and within the examination object, having an interface and a computing unit.

The interface is embodied for providing the artifact-affected x-ray image dataset or for providing a first projection dataset comprising a plurality of projections.

The computing unit is then embodied for creation of a first projection dataset comprising a plurality of projections based on the artifact-affected x-ray image dataset provided or for creation of the artifact-affected x-ray image dataset based on the first projection dataset.

The computing unit is moreover embodied for creation of a first artifact-reduced x-ray image dataset based on the artifact-affected x-ray image dataset, and embodied for creation of a second projection dataset based thereon.

Moreover the computing unit is embodied for identification of an object area in at least one projection of the plurality of projections of the first projection dataset, which maps the object in the at least one projection.

The computing unit is further embodied for creation of a third projection dataset by adaptation of a projection value in the identified object area of the at least one projection based on a projection value of the second projection dataset and as a function of a measure of the influencing by the artifact.

The computing unit is furthermore embodied for creation of the second artifact-reduced x-ray image dataset based on the third projection dataset.

The interface is moreover embodied to provide the second artifact-reduced x-ray image dataset.

Such a processing unit for providing a second artifact-reduced x-ray image dataset based on an artifact-affected x-ray image dataset of an examination object can be embodied in particular to carry out the previously described inventive method for providing a second artifact-reduced x-ray image dataset based on an artifact-affected x-ray image dataset of an examination object and its aspects. The processing unit can be embodied to carry out this method and its aspects in that the computing unit and the interface are embodied to carry out the corresponding method steps.

The advantages of the proposed processing unit essentially correspond to the advantages of the proposed method for providing a second artifact-reduced x-ray image dataset based on an artifact-affected x-ray image dataset of an examination object. Features, advantages or alternate forms of embodiment mentioned here can likewise also be transferred to the processing unit for providing a second, artifact-reduced x-ray image dataset and vice versa.

The processing unit can in particular be coupled to a medical imaging device for signaling purposes or be included in the device, which is embodied to record a projection dataset of an examination object from a plurality of projection directions, based on which an x-ray image dataset can be created.

At least one embodiment of the invention further relates to a medical imaging device comprising a processing unit for providing a second artifact-reduced x-ray image dataset. In this case the medical imaging device is advantageously embodied for carrying out a form of embodiment of the proposed method for providing a second artifact-reduced x-ray image dataset. The advantages of the proposed medical imaging device essentially correspond to the advantages of the proposed method for providing a second, artifact-reduced x-ray image dataset. Features, advantages or alternate forms of embodiment mentioned here can likewise also be transferred to the medical device and vice versa.

The medical imaging device is in particular an x-ray imaging device embodied to determine an x-ray image dataset. The medical x-ray imaging device can comprise an x-ray source and an x-ray detector mounted opposite it, wherein the examination object can be positioned between the x-ray detector and the x-ray source for recording the image.

The medical x-ray imaging device can be embodied in particular, based on a plurality of projection directions, to record projections of the examination object corresponding to an irradiation of the examination object with x-ray radiation from the projection directions. Then, via a reconstruction algorithm, for example a filtered back projection, a two-dimensional or three-dimensional x-ray image dataset can be created from a projection dataset comprising the plurality of projections.

The medical device can be embodied in particular as a computed tomography device. The medical device can however also comprise a C-arm x-ray device and/or Dyna-CT or another type of x-ray imaging device for example, which is embodied to record projections of the examination object from different projection directions and subsequently create an x-ray image dataset.

At least one embodiment of the invention also relates to a computer program product with a computer program, which is able to be loaded directly into a memory of a processing unit, with program sections for carrying out all steps of the method of an embodiment for provision of a second artifact-reduced x-ray image dataset or its aspects when the program sections are executed by the processing unit.

At least one embodiment of the invention also relates to a computer-readable storage medium, on which program sections able to be read and executed by a processing unit are stored, for carrying out all steps of the method of an embodiment for providing a second artifact-reduced x-ray image dataset or its aspects when the program sections are executed by the processing unit.

A largely software-based realization has the advantage that apparatuses already used previously can be upgraded in a simple manner by a software update in order to work in the inventive way. Such a computer program product, in addition to the computer program, can if necessary comprise additional elements such as e.g. documentation and/or additional components, as well as hardware components, such as e.g. hardware keys (dongles etc.) for use of the software.

Also, within the framework of the invention, features that are described in relation to different forms of embodiment of the invention and/or different claims categories (method, use, apparatus, system, arrangement etc.) can be combined into further forms of embodiment. For example a claim that relates to an apparatus can also be developed with features that or described or claimed in conjunction with a method and vice versa. Functional features of a method in this case can be carried out by correspondingly embodied physical components. As well as the forms of embodiment of the invention expressly described in this application, numerous further forms of embodiment of the invention are conceivable, at which the person skilled in the art can arrive without departing from the field of the invention that is specified by the claims.

The use of the indefinite article "a" or "an" does not exclude the feature concerned also being able to be present multiple times. The use of the expression "have" does not exclude the terms linked by way of the term "have" being able to be identical. For example the medical imaging apparatus has the medical imaging apparatus. The use of the term "unit" does not exclude the object to which the term "unit" relates having a number of components that are physically separated from one another.

The term "based on", in the context of the present application, can be understood in particular in the sense of the term "using". In particular a formulation that a first feature is created (alternatively: established, determined etc.) based on a second feature does not exclude the first feature being able to be created (alternatively: established, determined etc.) based on a third feature.

FIG. 1 shows a schematic sequence of a method for providing a second artifact-reduced x-ray image dataset $ID_{corr}$ based on an artifact-affected x-ray image dataset $ID_{ini}$ of an examination object 39, wherein the artifact is caused by an object 1 at least one of on, outside of and within the examination object 39.

An object on the examination object in this case in particular includes an object that is introduced into the examination object, i.e. is present within an examination object or is arranged at or on, but outside of, the examination object.

The method comprises the step of providing S1 a first projection dataset $PD_{ini}$ comprising a plurality of projections, based on which the artifact-affected x-ray image dataset $ID_{ini}$ is created.

Each projection of the plurality can correspond in this case to an irradiation of the examination object 39 with x-ray radiation from a projection direction.

As an alternative the method can comprise the step of providing S2 the artifact-affected x-ray image dataset $PD_{ini}$, based on which a first projection dataset $PD_{ini}$ comprising a plurality of projections is created.

From a projection dataset an x-ray image dataset can be reconstructed via a reconstruction algorithm, for example a filtered back projection or another type of algorithm. Moreover, from an x-ray image dataset, a projection dataset comprising a plurality of projections can be created, for example by applying a forward projection to the x-ray image dataset. If, as part of the method, a projection dataset is created, the projections comprised by the projection dataset preferably each correspond to one (virtual) irradiation of the examination object 39 with x-ray radiation from different projection directions. In this case the projection datasets used within the framework of the proposed method preferably comprise projections from the same projection directions in each case.

The method furthermore comprises the step of first creation S3 of a first artifact-reduced x-ray image dataset $ID_{prior}$ based on the artifact-affected x-ray image dataset $ID_{ini}$, based on which a second projection dataset $PD_{prior}$ is created.

In accordance with an advantageous embodiment variant this step can comprise the application of an artifact correction algorithm or a material decomposition based on the artifact-affected x-ray image dataset $ID_{ini}$.

Moreover, in accordance with the invention, the method comprises the step of identification S4, wherein an object area in at least one projection of the plurality of projections of the first projection dataset $PD_{ini}$, which maps the object 1 in the at least one projection, is identified. In particular the identification S4 of an object area can comprise a projection value in a projection considered being assigned to the object 1 or being identified as being included in the object area.

In this case the identification S4 of the object area can be based on the application of a trained function.

In a further step of second creation S5 a third projection dataset $PD_{corr}$ based on the first projection dataset $PD_{ini}$ is created, wherein a projection value in the identified object area is adapted based on a projection value of the second projection dataset $PD_{prior}$ and as a function of a measure of the influencing of the projection value by the artifact.

In a step of third creation S6 the second artifact-reduced x-ray image dataset $ID_{corr}$ is created based on the third projection dataset $PD_{corr}$, through which the second, artifact-reduced x-ray image dataset $ID_{corr}$ can be provided.

In accordance with an embodiment variant of the method, the method furthermore comprises the step of creation S7 of an object image dataset $ID_{obj}$, which essentially only comprises the image information of the object 1, based on the artifact-affected x-ray image dataset $ID_{ini}$ or the first artifact-reduced x-ray image dataset $ID_{prior}$, wherein in the step of identification S3, the object area is identified by way of the object image dataset $ID_{obj}$.

In accordance with a variant of the method the object image dataset $ID_{obj}$ can be created by the object 1 being segmented in the first artifact-reduced 3D image dataset $ID_{prior}$ or in the artifact-affected 3D image dataset $ID_{ini}$.

In accordance with an advantageous development of the method in this case, in the step of second creation S5 of the projection value in the identified object area the at least one projection can be replaced by a weighted combination of the projection value to be adapted and the projection value of the second projection dataset $PD_{prior}$ and wherein the weights for the weighted combination are dependent on the measure of influencing by the artifact.

Furthermore there can advantageously be provision for the weights for the weighted combination to be dependent on an irradiation length of the object during the irradiation of the examination object 39 from the projection direction of the projection considered.

Furthermore there can advantageously be provision for the weights to be chosen in such a way that the weighted combination approaches the projection value of the second projection dataset $PD_{prior}$, when the irradiation length approaches a maximum irradiation length value that can occur and for the weighted combination to approach the projection value of the first projection dataset $PD_{ini}$ when the irradiation length approaches a minimum irradiation length value that can occur.

An irradiation length or weights, which take account of the irradiation length of the object 1, can be determined in an advantageous way based on an object image dataset $ID_{obj}$, which essentially only comprises the image information of the object 1. Such an object image dataset $ID_{obj}$ can be created based on the artifact-affected x-ray image dataset $ID_{ini}$ or based on the first artifact-reduced x-ray image dataset $ID_{prior}$. An object image dataset $ID_{obj}$ used for the determination of weights can in particular correspond in method variants to the previously described object image dataset.

There can be method variants of the inventive method in which the step of identification S4 and of creation S5 of the third projection dataset $PD_{corr}$ are carried out essentially simultaneously. In particular weights, i.e. a weighting function which was derived based on an object image dataset and serves to adapt projection values in the first projection dataset, can be used at the same time for an identification, by the weights being selected in such a way that, on application of the weighting function to a projection of the first projection dataset, there is only an adaptation of projection values within an object area taken into consideration by the weights and the projection values are not adapted outside an identified object area.

Within the framework of the inventive method there can moreover be provision, in the step of third creation S6, for an artifact image dataset $ID_{art}$, which only contains artifact elements, to be created based on the third projection dataset $PD_{corr}$ and the first projection dataset $PD_{ini}$, and wherein the artifact image dataset $ID_{art}$ is applied to the artifact-affected x-ray image dataset $ID_{ini}$ for the creation of the second, artifact-reduced x-ray image dataset $ID_{corr}$.

In this case the artifact image dataset $ID_{art}$ can be applied to the artifact-affected x-ray image dataset $ID_{ini}$ such that it is scaled via a scaling factor.

As an alternative or in addition the artifact image dataset $ID_{art}$ can be applied such that it is filtered via an image filter to the artifact-affected x-ray image dataset $ID_{ini}$.

Figure 2:
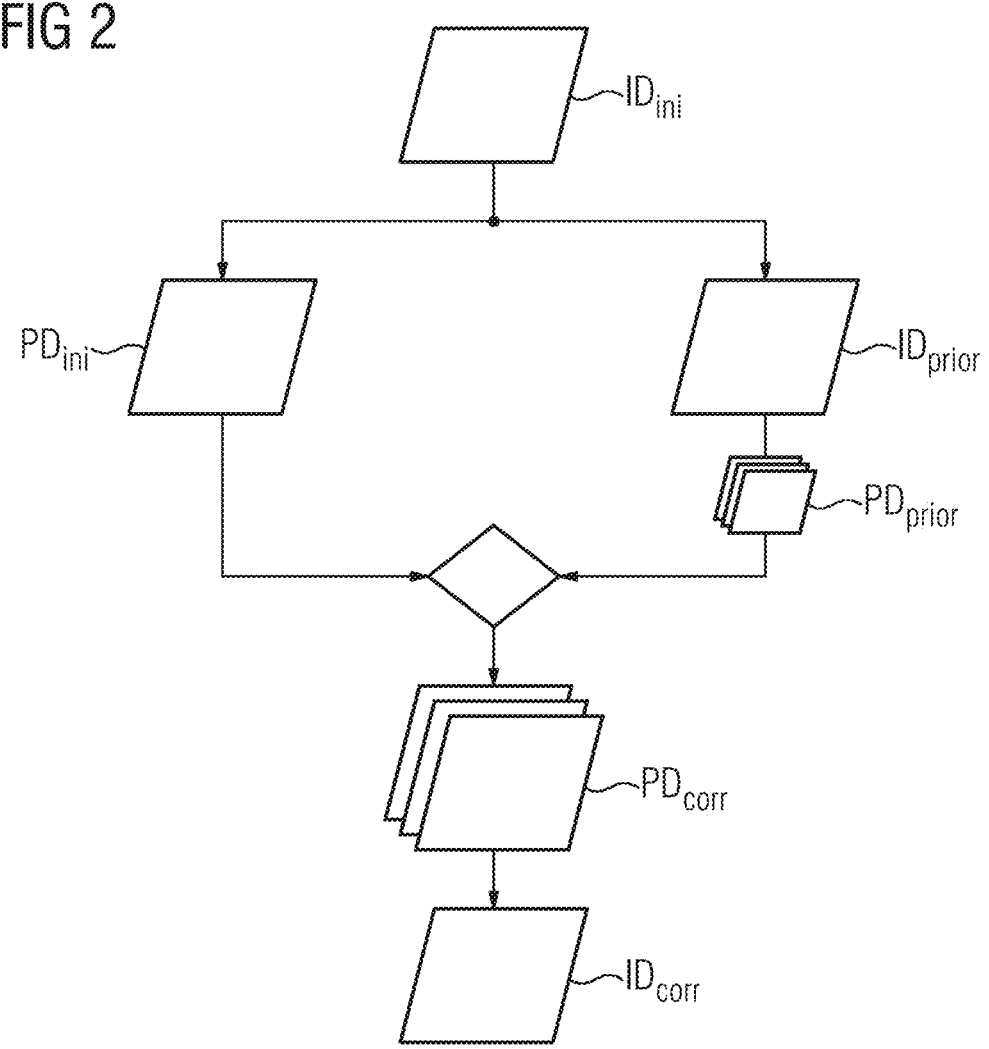
FIG. 2 shows a schematic diagram of a data flow in a method variant of a method for providing a second artifact-reduced x-ray image dataset.

FIG. 2 shows a schematic diagram of a data flow in a method variant of a method for providing a second artifact-reduced x-ray image dataset $ID_{corr}$.

In this variant an artifact-affected x-ray image dataset $ID_{ini}$ of an examination object 39 is provided, wherein the artifact is caused by an object 1 on the examination object 39.

The artifact-affected x-ray image dataset $ID_{ini}$ or the measured projection dataset on which this based can be recorded from the examination object and/or provided via a medical imaging device. The medical imaging device for recording the x-ray image dataset can be embodied for example as a medical x-ray device, in particular as a computed tomography device (CT device).

The artifact can in particular be based on an effect of radiation hardening or of scattering at the object. The object can in particular comprise a strongly absorbent material, which has a coefficient of absorption for x-ray radiation similar to or higher than bone for example. In particular the object can comprise a metallic material. The object can for example correspond to an intervention needle.

Furthermore a first projection dataset $PD_{ini}$ comprising a plurality of projections is provided by the first projection dataset $PD_{ini}$ being created based on the artifact-affected x-ray image dataset $ID_{ini}$, via a forward projection for example.

Furthermore a first, artifact-reduced x-ray image dataset $ID_{prior}$ is created. The first artifact-reduced x-ray image dataset $ID_{prior}$ is likewise determined based on the artifact-affected x-ray image dataset $ID_{ini}$, for example by application of a metal artifact correction algorithm or a material decomposition based on the artifact-affected x-ray image dataset $ID_{ini}$. Based on the first, artifact-reduced x-ray image dataset $ID_{prior}$ a second projection dataset $PD_{prior}$, comprising a plurality of projections, is created.

Furthermore, based on the first projection dataset $PD_{ini}$, a third projection dataset $PD_{corr}$ is created and provided. To this end an object area in at least one projection of the plurality of projections of the first projection dataset $PD_{ini}$, which maps the object 1 in the at least one projection, is identified and a projection value in the identified object area of the at least one projection based on a projection value of the second projection dataset $PD_{prior}$ is adapted as a function of a measure of the influencing of the projection value by the artifact.

The second, artifact-reduced x-ray image dataset $ID_{corr}$ can then be created and provided based on the third projection dataset $PD_{corr}$.

Figure 3:
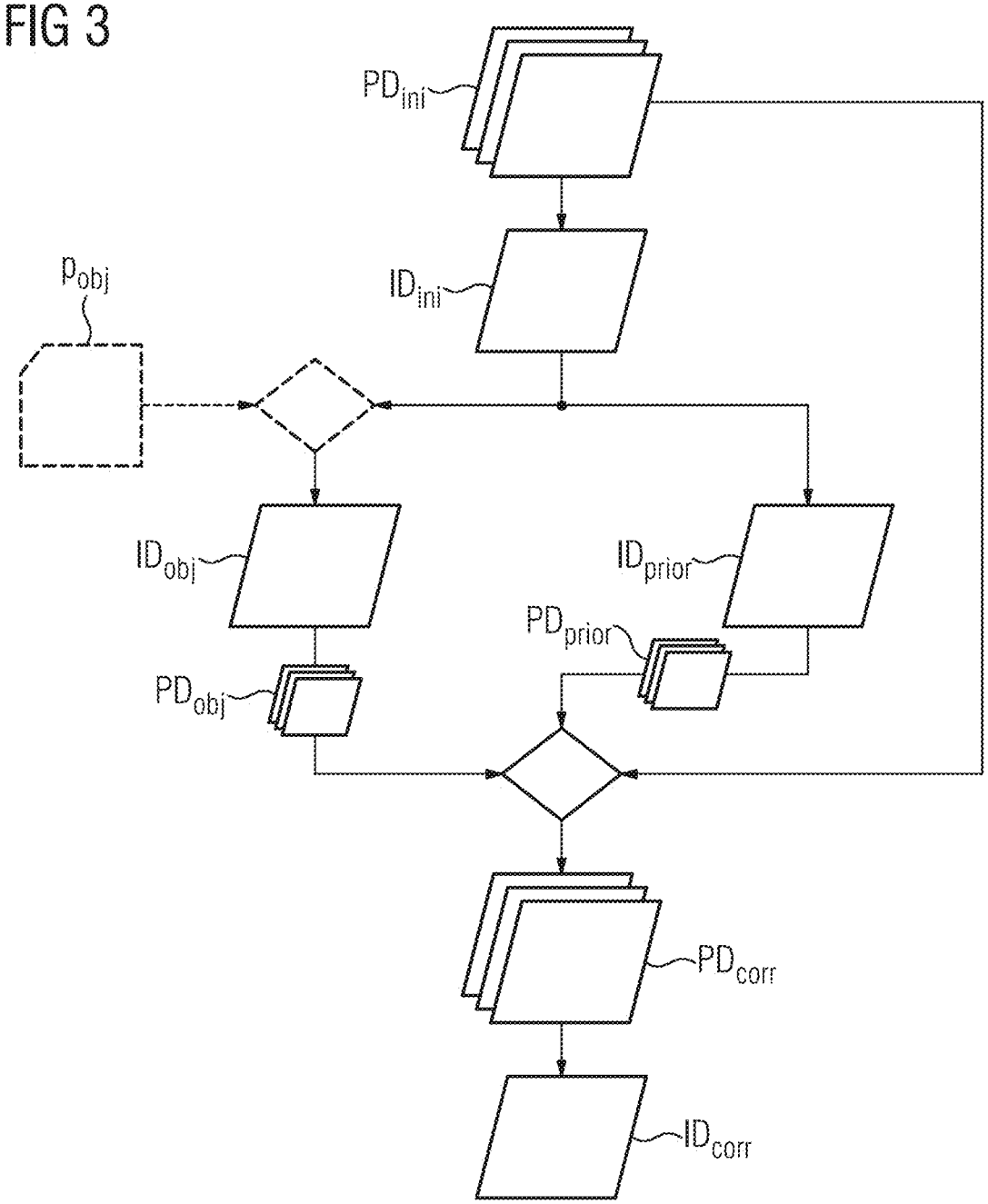
FIG. 3 shows a schematic diagram of a data flow in a second method variant of a method for providing a second artifact-reduced x-ray image dataset.

FIG. 3 shows a schematic diagram of a data flow in a second method variant of a method for providing a second artifact-reduced x-ray image dataset $ID_{corr}$.

In this variant an artifact-affected first projection dataset $PD_{ini}$ comprising a plurality of projections is provided. The first projection dataset $PD_{ini}$ can be recorded and/or provided via a medical imaging device from the examination object comprising the object. Based thereon a first artifact-affected x-ray image dataset $ID_{ini}$ is reconstructed via a reconstruction method, comprising a filtered back projection for example. Equally, corresponding to FIG. 1, an artifact-affected x-ray image dataset $ID_{ini}$ could be provided and the first projection dataset $PD_{ini}$ created on the basis thereof.

Then, based on the first artifact-affected x-ray image dataset $ID_{ini}$, an artifact-reduced x-ray image dataset $ID_{prior}$ and an object image dataset $ID_{obj}$ are determined. As an alternative an object image dataset $ID_{obj}$ can also be determined from the artifact-reduced x-ray image dataset.

The object image dataset essentially comprises only the image information of the object and can in particular comprise a segmentation of the object in the first, artifact-reduced x-ray image dataset or in the artifact-affected x-ray image dataset.

The segmentation can comprise the application of a trained function. For example the trained function can be trained with a plurality of training image datasets, which comprise training objects. The trained function can then be used efficiently in terms of time to precisely segment objects of the same object type. For example the training objects can comprise a plurality of different intervention needles that are usually used in an intervention setup, so that a quick and precise segmentation of an intervention needle in an x-ray image dataset is made possible.

Furthermore an expected object position $p_{obj}$ of the object 1, for example a planned guide path of an intervention needle, on or in the examination object 39 can be included in an embodiment variant of the proposed method in the segmentation for an especially exact segmentation. The expected object position $p_{obj}$ can be included in the segmentation by an image environment in the artifact-affected image dataset $ID_{ini}$ or first artifact-reduced image dataset $ID_{prior}$ for the segmentation being limited to an environment of the expected object position $p_{obj}$. The expected object position $p_{obj}$ can be included in the segmentation by the position functioning as an input parameter for a trained function. For example a trained function can be applied to the artifact-affected x-ray image dataset $ID_{ini}$ in combination with the information about a planned object position $p_{obj}$. The segmented object can then be the output of the trained function.

Furthermore, based on the artifact-reduced x-ray image dataset $ID_{prior}$, an artifact-reduced second projection dataset $PD_{prior}$ is created, for example via a forward projection of the artifact-reduced x-ray image dataset $ID_{prior}$. Based on the object image dataset $ID_{obj}$ an object-projection dataset $PD_{obj}$ is also determined in this variant, for example via a forward projection of the object image dataset $ID_{obj}$.

A projection of the object-projection dataset $PD_{obj}$ essentially has projection values only in the areas that map the object 1 in the projection and thus are included in the object area. In particular the projection values in the object-projection dataset $PD_{obj}$ can be dependent on the irradiation length of the object 1 from a respective projection direction. An object area identified in an object-projection dataset $PD_{obj}$ can in particular be transferred to the first projection dataset $PD_{ini}$ and also to the second projection dataset $PD_{prior}$.

Based on the object image dataset $ID_{obj}$ or on the object projection dataset $PD_{obj}$ created from it, a measure of the influencing of a projection value by the artifact can also be derived in an advantageous manner.

In this way for example a projection value occurring as an extreme in the object projection dataset can indicate the maximum irradiation length occurring in the dataset. For example the respective projection values occurring in the object projection dataset can be put into at least a relative relationship by a comparison with the projection value occurring as an extreme, from which a measure of an expected artifact influence of a respective projection value can be derived.

Based on the object-projection dataset $PD_{obj}$ can a weighting function can be determined for example, which describes the weights for a weighted combination for the step of creating the third projection dataset $PD_{corr}$.

Such a weighting function can for example be defined in the following way:

$$w = 1 - \left(\frac{P_{obj}}{\max(P_{obj})}\right)^2$$

with $P_{obj}$ being the projection values in a respective projection of the object-projection dataset $P_{obj}$.

In this case a weight approaches the value of zero in the case in which the projection value $P_{obj}$ approaches the maximum projection value occurring in the projections, i.e. in the case of a long irradiation length of the object, and approaches the value of 1, i.e. corresponds to a greater weight, when the projection value $P_{obj}$ is small, i.e. with a short irradiation length. Away from the object the projection value in the object projection dataset is preferably zero, which would correspond to a value of 1.

There can however also be other definitions of a possible weighting function, which can likewise be employed within the framework of the method.

Such a weighting function can in particular equally be employed for an identification of the object area in a projection and also for a weighted combination for the adaptation of a projection value.

Adapted projection values in a respective projection of the third projection dataset $PD_{corr}$ can be determined by application of the weighting function to the projection values of a projection of the first projection dataset $PD_{ini}$ in conjunction with the projection values of the corresponding projection of the second projection dataset $PD_{prior}$. The precise definition of the combination can depend on the weighting function chosen. In the case of the above function a weighted function can be defined as follows:

$$P_{corr} = w \cdot P_{prior} + (1-w) \cdot P_{ini}$$

with a projection value $P_{ini}$ in a projection of the first projection dataset $PD_{ini}$, a projection value $P_{prior}$ corresponding to the location thereof in the corresponding projection of the second projection dataset $PD_{prior}$ and the projection value $P_{corr}$ produced for the third projection dataset $PD_{corr}$. In this case the weight w corresponds to the weight that results from the projection value of the projection value of the object-projection dataset $PD_{obj}$ corresponding to the first projection dataset $PD_{ini}$ to be adapted.

The result of this is that the weighted combination approaches the projection value of the second projection dataset $PD_{prior}$ when the irradiation length approaches a maximum irradiation length value occurring and the weighted combination approaches the projection value of the first projection dataset $PD_{ini}$ when the irradiation length approaches a minimum irradiation length value occurring.

In this case the weighting function is applied, at least in that projection with greatest overlap of the irradiation length through the object with one projection direction. Preferably the weighting function is applied to a number of projections or to all projections of the plurality of projections of the first projection dataset.

Based on the third projection dataset $PD_{corr}$ created thereby, the second artifact-reduced x-ray image dataset $ID_{corr}$ can then be created and provided.

In this embodiment variant the application of the weights to the projections represents a simultaneous identification of an object area in a projection and creation of the third projection dataset. The weights are chosen in such a way that only those projection values are adapted with weighting that correspondingly have a projection value in the object image dataset and are thus included in an object area. Outside of the object area defined by the object image dataset or by the projection dataset based thereon there is no adaptation however.

Figure 4:
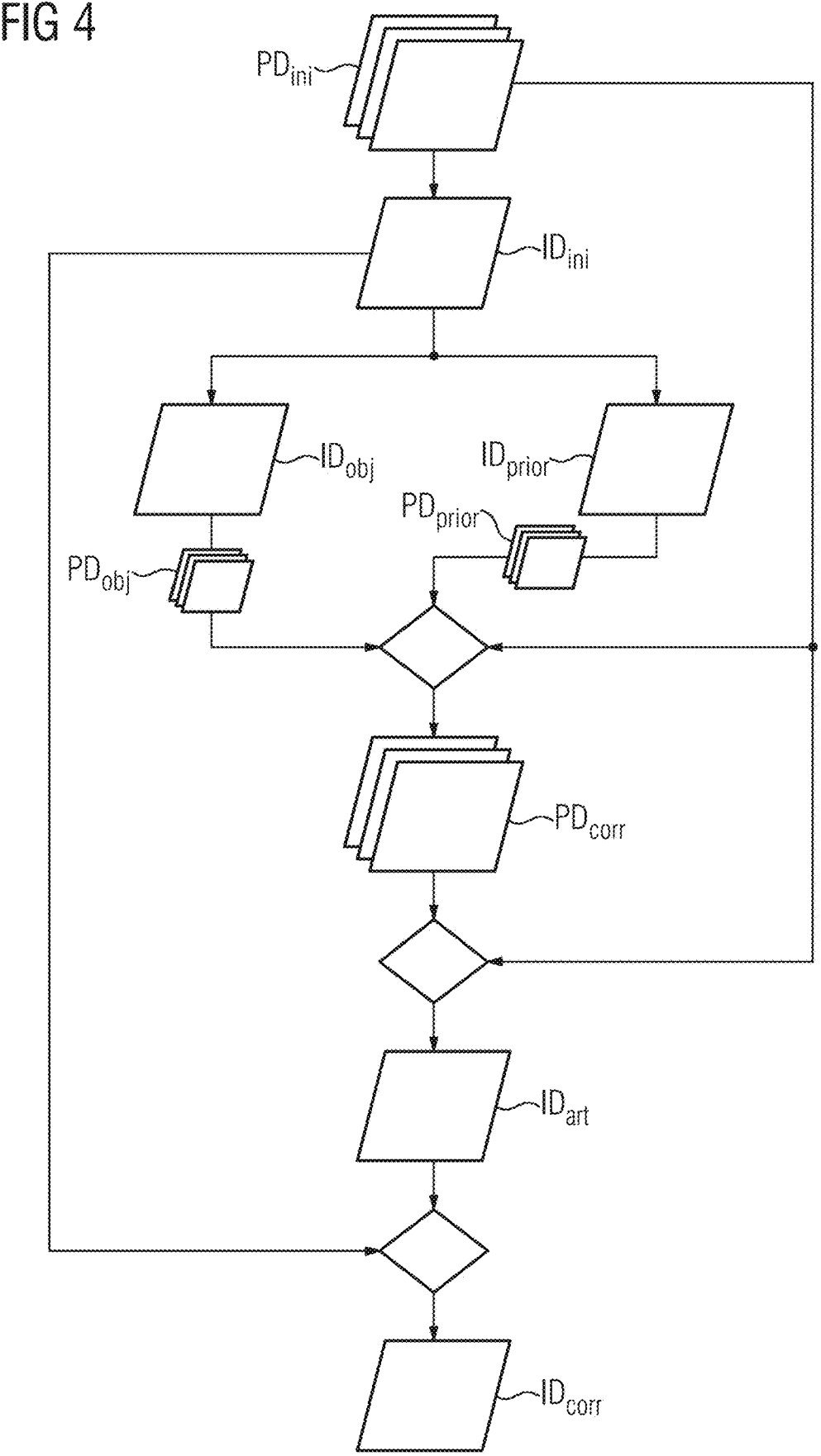
FIG. 4 shows a schematic diagram of a data flow in a third method variant of a method for providing a second artifact-reduced x-ray image dataset.

FIG. 4 shows a schematic diagram of a data flow in a third method variant of a method for providing a second artifact-reduced x-ray image dataset $ID_{corr}$.

By comparison with the second variant, this variant also comprises an artifact image dataset $ID_{art}$ being determined based on the corrected third projection dataset $PD_{corr}$ and the initial, first projection dataset $PD_{ini}$. An option for creating an artifact image dataset $ID_{art}$ is represented by the formation of a difference image dataset based on a difference between the respective corresponding projection values of the respective projection datasets:

$$ID_{art} = R(P_{ini} - P_{corr})$$

In this equation R corresponds to a reconstruction operator, for example comprising a filtered back projection.

Then, by application of the artifact image dataset $ID_{art}$ to the initial artifact-affected x-ray image dataset $ID_{ini}$ the second artifact-reduced x-ray image dataset $ID_{corr}$ can be provided.

Preferably in this case the artifact image dataset $ID_{art}$ is included, at least scaled, more preferably scaled and filtered:

$$ID_{corr} = ID_{ini} - \alpha \cdot F(R(P_{ini} - P_{corr})) = ID_{ini} - \alpha \cdot F(ID_{art})$$

with a scaling factor $\alpha$ and an image filter F. This makes it possible on the one hand by way of the scaling factor $\alpha$ to adapt the correction in an improved manner and via the image filter F if necessary to minimize any new artifacts induced by the adaptation in the second artifact-reduced x-ray image dataset $ID_{corr}$.

Figure 5:
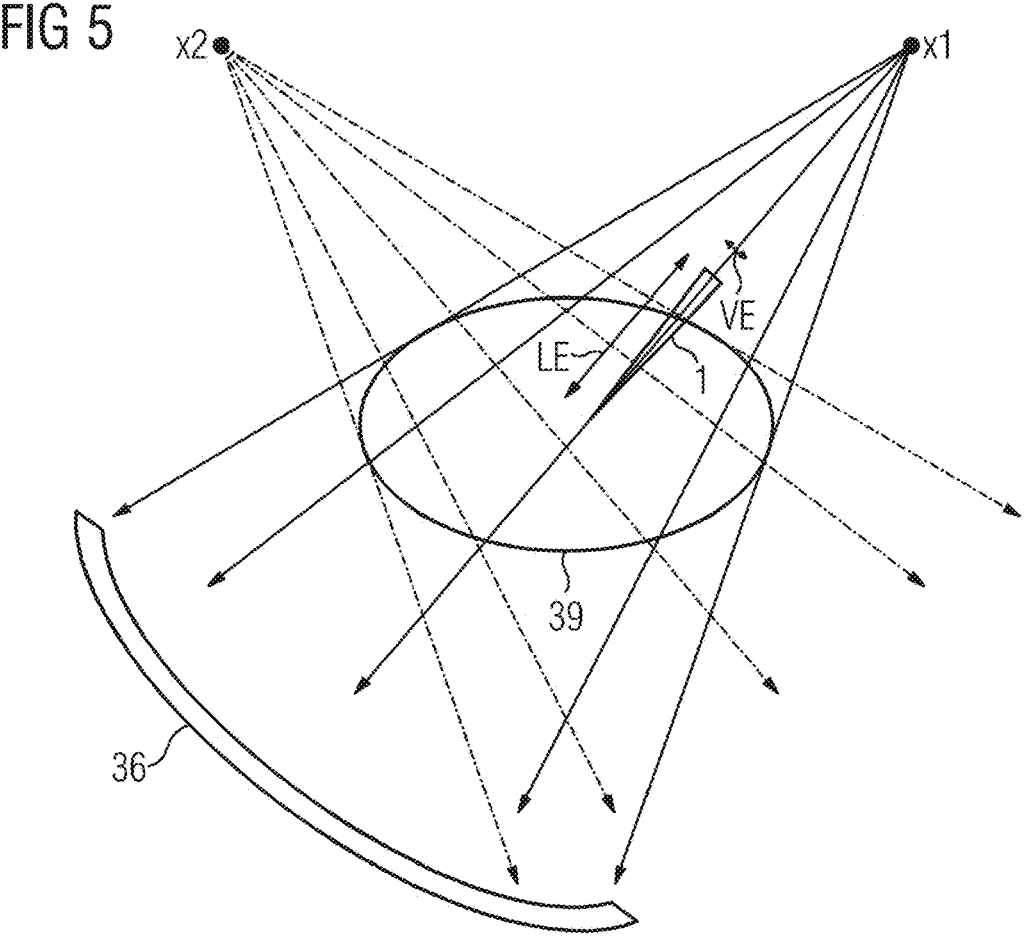
FIG. 5 shows a schematic illustration of an arrangement of an examination object with an object during an irradiation of the examination object with x-ray radiation from different projection directions.

FIG. 5 shows a schematic of an illustration of an arrangement of an examination object 39 with an object 1 during an irradiation of the examination object 39 with x-ray radiation from different projection directions starting from the positions x1 and x2. The projections can be recorded in this case via an x-ray detector 36 opposite the x-ray source 37 emitting the x-ray radiation (not shown here). In the diagram shown the x-ray detector is positioned for the recording of a projection from the projection direction starting from a position x1. For the recording of a projection starting from the position x2, the x-ray detector would be arranged accordingly shifted radially to opposite position x2.

The object 1 schematically represents a strongly asymmetrical object with a maximum longitudinal extent LE and a smaller transverse extent VE compared thereto. Preferably the maximum transverse extent VE comprises a maximum of 30%, preferably less, for example less than 10%, of the longitudinal extent LE. The transverse extent VE can also be in the range of a slice thickness of the examination object that is mapped by a projection of the projection dataset. For example the transverse extent VE of the object 1 can comprise six or fewer slice thicknesses. The object 1 is arranged in the examination object 39 in such a way that a majority of the longitudinal extent LE of the object 1 overlaps with a projection direction of a projection of the plurality of projections.

During an irradiation of the object from a projection direction from a position x1 the irradiation length of the object is far longer than with an irradiation length from a projection direction from a position x2.

The influencing of the projection values by an effect causing the artifact is therefore much more marked from the one projection direction than from another projection direction. In particular the projection values in an object area, which maps the object in the projection, can be strongly affected by an artifact, while in another projection the projection values in an object area, which maps the object in the projection, are influenced slightly to not at all. The method advantageously allows a targeted adaptation of those projections that feature an influencing, while uninfluenced projections can be retained.

For example with an intervention setup, as a result of ergonomic considerations, an intervention needle can be introduced essentially in parallel to a projection direction. What is more, this makes it possible to improve the tracing and determine the positioning more exactly of the needle in the x-ray image dataset. However, in particular due to the large overlap of the longitudinal extent of the intervention needle with a projection direction, this disadvantageously results in artifacts, which can render an exact localization of the tip of the needle more difficult. Advantageously the proposed method can make an improvement possible here with efficient timing, which also avoids disadvantageous effects of other correction algorithms, such as a reduced image sharpness.

Figure 6:
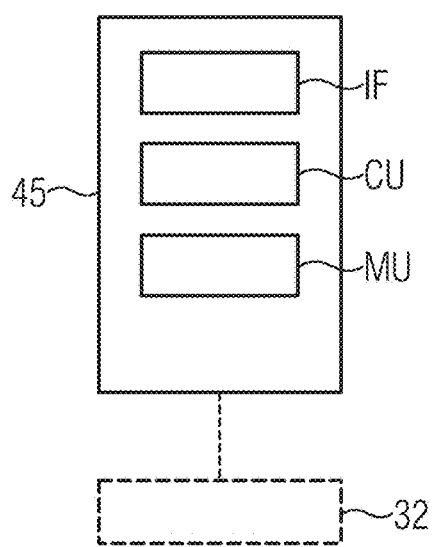
FIG. 6 shows a schematic diagram of a processing unit for providing a second artifact-reduced x-ray image dataset.

FIG. 6 shows a schematic diagram of a processing unit 45. The processing unit 45 can advantageously be embodied to carry out an inventive method for providing a second artifact-reduced x-ray image dataset $ID_{corr}$ based on an artifact-affected x-ray image dataset $ID_{ini}$ of an examination object 39, wherein the artifact is caused by an object 1 at least one of on, outside of and within the examination object 39.

The processing unit 45 has an interface IF and a computing unit CU and a memory unit MU.

In this figure the interface IF is embodied for providing the artifact-affected x-ray image dataset $PD_{ini}$ or for providing a first projection dataset $PD_{ini}$ comprising a plurality of projections, wherein the artifact-affected x-ray image dataset $ID_{ini}$ is based on the first projection dataset $PD_{ini}$ provided.

The computing unit CU can then be embodied for creation of a first projection dataset $PD_{ini}$ comprising a plurality of projections based on the artifact-affected x-ray image dataset $PD_{ini}$ provided or for creation of the artifact-affected x-ray image dataset $PD_{ini}$ based on the first projection dataset $PD_{ini}$ provided.

The computing unit CU can further be embodied for creation of a first artifact-reduced x-ray image dataset $ID_{prior}$ based on the artifact-affected x-ray image dataset $ID_{ini}$, and for creation based thereon of a second projection dataset $PD_{prior}$.

Furthermore the computing unit can be embodied for identification of an object area in at least one projection of the plurality of projections of the first projection dataset $PD_{ini}$, which maps the object 1 in the at least one projection.

Moreover the computing unit CU can be embodied for creation of a third projection dataset $PD_{corr}$ based on the first projection dataset $PD_{ini}$, wherein a projection value is adapted in the identified object area of the at least one projection based on a projection value of the second projection dataset $PD_{prior}$ and as a function of a measure of the influencing by the artifact.

The computing unit CU can moreover be embodied for creation of the second artifact-reduced x-ray image dataset $ID_{corr}$ based on the third projection dataset $PD_{corr}$.

The interface IF can further be embodied for providing the second artifact-reduced x-ray image dataset $ID_{corr}$.

The proposed processing unit can be embodied to carry out the embodiment variants of the proposed method for providing a second artifact-reduced x-ray image dataset, in that the processing unit 45, comprising the interface IF and the computing unit CU, is embodied to carry out the respective steps of the method.

The processing unit 45 can in particular involve a computer, a microcontroller or an integrated circuit. As an alternative the processing unit 45 can involve a real or virtual network of computers (a technical term for a real network is "cluster", a technical term for a virtual network is "cloud"). The processing unit 45 can also be embodied as a virtual system, which is executed on a real computer or a real or virtual network of computers (virtualization). A computing unit CU can have hardware elements or software elements, for example a microprocessor or what is known as an FPGA (Field Programmable Gate Array). The computing unit CU can in particular comprise a number of subordinate computing units that execute different steps of the respective method. In other words the computing unit CU can also be expressed as a plurality of computing units CU.

A memory unit MU can be realized as a non-permanent working memory (Random Access Memory, abbreviated to RAM) or as permanent mass storage (hard disk, US stick, SD card, solid state disk).

An interface IF can involve a hardware or software interface (for example PCI bus, USB or Firewire). The interface IF can in particular comprise a number of sub-interfaces, which can carry out different steps of the respective method. In other words the interface IF can also be expressed as a plurality of interfaces IF.

Figure 7:
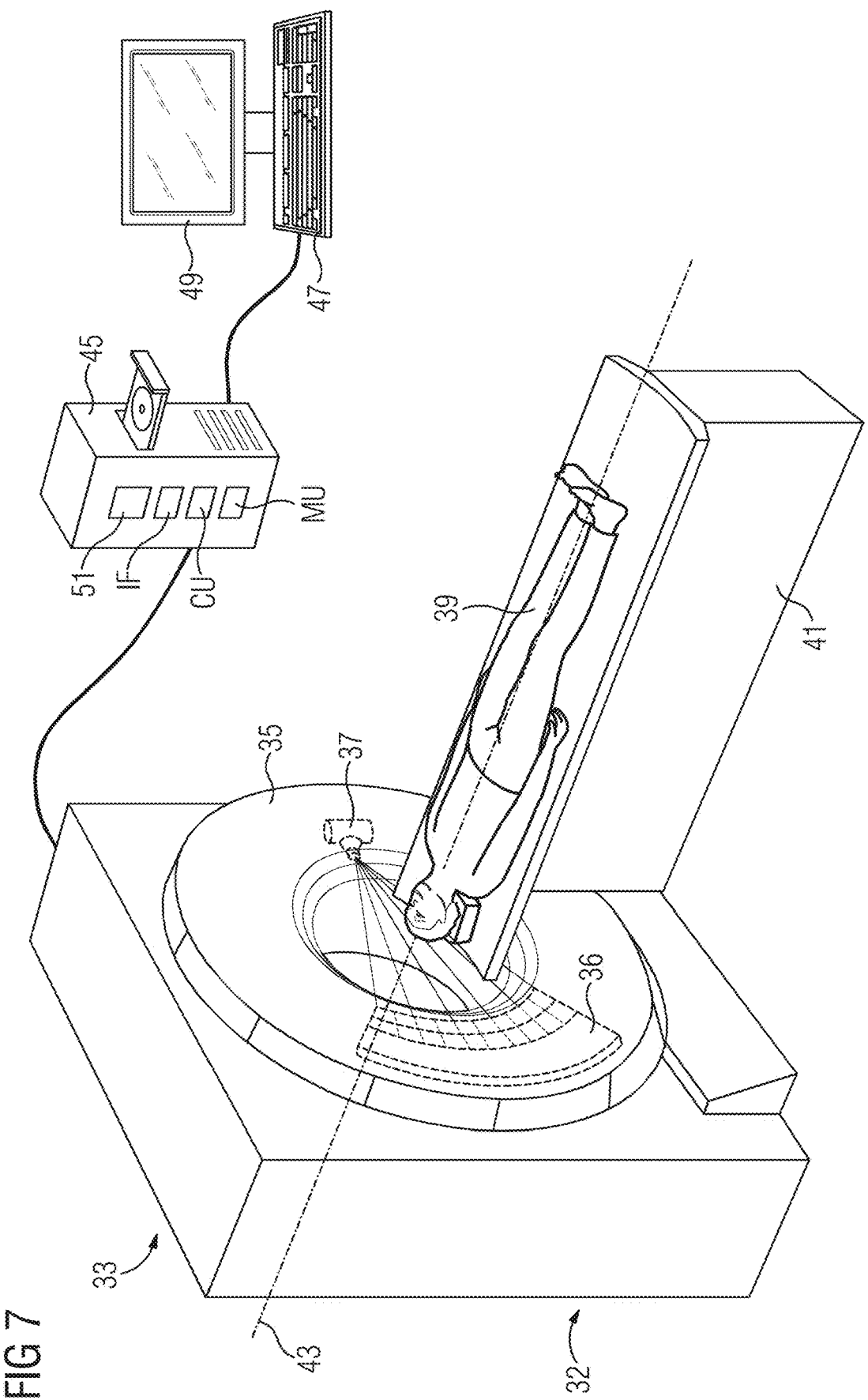
FIG. 7 shows a schematic diagram of a medical imaging device.

The FIG. 7 shows an example of a form of embodiment of an inventive medical imaging device 32, in particular a computed tomography device.

The computed tomography device has a gantry 33 with a rotor 35. The rotor 35 comprises a radiation source or x-ray source 37, in particular an x-ray tube, and opposite to this an x-ray detector unit 36. The x-ray detector unit 36 and the x-ray source 37 are able to be rotated about a common axis 43 (also called the axis of rotation z). The patient 39 is supported on the patient support apparatus 41 and is able to be moved along the axis of rotation z 43 by the gantry 33. In general the patient 39 can be an animal patient and/or a human patient for example.

In the case of a computed tomography device, a projection dataset is usually recorded from a plurality of angular directions, i.e. projection directions, via the x-ray detector unit 2 while the patient is moved continuously or sequentially through the gantry 33 via the patient support apparatus 41. The projection dataset comprises a plurality of projections, which each correspond to an irradiation of the examination object 39 with x-ray radiation from a projection direction. Subsequently, based on the recorded projection dataset by way of a mathematical method, for example comprising a filtered back projection, an x-ray image dataset can be reconstructed.

The medical imaging device furthermore comprises a processing unit 45. The processing unit 45 comprises a computing unit CU, an interface IF and a memory unit MU. The processing unit 45 can advantageously be embodied to execute a method in accordance with one of the variants described above for providing a second artifact-reduced x-ray image dataset $ID_{corr}$.

The processing unit 45 can furthermore comprise a control unit 51 of the medical device, with which the medical imaging device can be controlled.

Furthermore an input facility 47 and an output facility 49 are connected to the processing unit 45. The input facility 47 and the output facility 49 can for example make possible an interaction, for example a manual configuration, a confirmation or an initiation of a method step by a user.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for providing a second artifact-reduced x-ray image dataset based on an artifact-affected x-ray image dataset of an examination object, an artifact of the artifact-affected x-ray image dataset being caused by an object being at least one of on, outside of or within the examination object, the method comprising:
provisioning
the artifact-affected x-ray image dataset and creating a first projection dataset, including a plurality of projections, based on the artifact-affected x-ray image dataset, or
the first projection dataset including the plurality of projections, and creating the artifact-affected x-ray image dataset based on the first projection dataset;
creating a first artifact-reduced x-ray image dataset based on the artifact-affected x-ray image dataset, and creating a second projection dataset based on the first artifact-reduced x-ray image dataset;
identifying an object area; in at least one projection of the first projection dataset, the object area mapping the object in the at least one projection;
creating a third projection dataset based on the first projection dataset, the third projection dataset including an adapted projection value, the adapted projection value being a first projection value in the object area of the first projection dataset and adapted based on a second projection value of the second projection dataset and as a function of a measure of influence of the first projection value by the artifact; and
creating the second artifact-reduced x-ray image dataset based on the third projection dataset, the second artifact-reduced x-ray image dataset being provided based on the third projection dataset, and wherein
a respective projection of the plurality of projections corresponds to an irradiation of the examination object with x-ray radiation from a projection direction,
the object is an asymmetrical object, the asymmetrical object including a longitudinal extent and a transverse extent,
a maximum of the transverse extent is less than or equal to 30% of a maximum of the longitudinal extent, and
the object is in the examination object such that a majority of the longitudinal extent overlaps with the projection direction.

2. The method of claim 1, wherein the creating of the first artifact-reduced x-ray image dataset includes applying at least one of a metal artifact correction algorithm or a material decomposition to the artifact-affected x-ray image dataset.

3. The method of claim 1, wherein the identifying of the object area is based on an application of a trained function.

4. The method of claim 1, further comprising:
determining an object image dataset based on at least one of the artifact-affected x-ray image dataset or the first artifact-reduced x-ray image dataset, the object image data set including image information of the object, and wherein the identifying includes identifying the object area based on the object image dataset.

5. The method of claim 4, wherein the determining of the object image dataset includes segmenting the object in the first artifact-reduced x-ray image dataset or segmenting the object in the artifact-affected x-ray image dataset.

6. The method of claim 1, wherein the first projection value in the object area of the at least one projection is replaced by a weighted combination of the first projection value and the second projection value, and wherein weights for the weighted combination are dependent on a measure of influence by the artifact.

7. The method of claim 6, wherein a respective projection of the plurality of projections corresponds to an irradiation of the examination object with x-ray radiation from a projection direction, and wherein weights for the weighted combination are based on an irradiation length of the object during the irradiation of the examination object from the projection direction.

8. The method of claim 1, wherein the creating of the second artifact-reduced x-ray image dataset includes creating an artifact image dataset based on the third projection dataset and the first projection dataset, the artifact image dataset only including artifact elements, and wherein the artifact image dataset is applied to the artifact-affected x-ray image dataset in the creating of the second artifact-reduced x-ray image dataset.

9. The method of claim 8, wherein the artifact image dataset is applied to the artifact-affected x-ray image dataset to scale the artifact-affected x-ray image dataset based on a scaling factor.

10. The method of claim 8, wherein the artifact image dataset is applied to the artifact-affected x-ray image dataset to filter the artifact-affected x-ray image dataset via an image filter.

11. A processing unit for providing a second, artifact-reduced x-ray image dataset based on an artifact-affected x-ray image dataset of an examination object, an artifact of the artifact-affected x-ray image dataset being caused by an object being at least one of on, outside of or within the examination object, the processing unit comprising:
an interface configured to provide the second artifact-reduced x-ray image dataset and configured to provide the artifact-affected x-ray image dataset or a first projection dataset including a plurality of projections; and
at least one processor configured to
create a first projection dataset including a plurality of projections based on the artifact-affected x-ray image dataset provided or create the artifact-affected x-ray image dataset based on the first projection dataset provided,
create a first artifact-reduced x-ray image dataset based on the artifact-affected x-ray image dataset,
create a second projection dataset based on the first artifact-reduced x-ray image dataset,
identify an object area in at least one projection of the plurality of projections of the first projection dataset, the object area mapping the object in the at least one projection,
create a third projection dataset based on the first projection dataset, the third projection dataset including an adapted projection value, the adapted projection value being a first projection value in the object area of the first projection dataset and adapted based on a second projection value of the second projection dataset and as a function of a measure of influence of the first projection value by the artifact, and
create the second, artifact-reduced x-ray image dataset based on the third projection dataset, and wherein
a respective projection of the plurality of projections corresponds to an irradiation of the examination object with x-ray radiation from a projection direction,
the object is an asymmetrical object, the asymmetrical object including a longitudinal extent and a transverse extent,
a maximum of the transverse extent is less than or equal to 30% of a maximum of the longitudinal extent, and
the object is in the examination object such that a majority of the longitudinal extent overlaps with the projection direction.

12. A medical imaging device comprising the processing unit of claim 11.

13. A non-transitory computer program product storing a computer program, directly loadable into a memory unit of a processor, including program sections for carrying out the method of claim 1 when the program sections are executed by the processor.

14. A non-transitory computer-readable storage medium storing executable instructions for providing a second artifact-reduced x-ray image dataset based on an artifact-affected x-ray image dataset of an examination object, an artifact of the artifact-affected x-ray image dataset being caused by an object being at least one of on, outside of or within the examination object, that, when executed by one or more processors, configure the processor to
provision
the artifact-affected x-ray image dataset and creating a first projection dataset including a plurality of projections, based on the artifact-affected x-ray image dataset, or
a first projection dataset including a plurality of projections, and creating the artifact-affected x-ray image dataset based on the first projection dataset,
create a first artifact-reduced x-ray image dataset based on the artifact-affected x-ray image dataset, and create a second projection dataset based on the first artifact-reduced x-ray image dataset,
identify an object area in at least one projection of the first projection dataset, the object area mapping the object in the at least one projection,
create a third projection dataset based on the first projection dataset, the third projection dataset including an adapted projection value, the adapted projection value being a first projection value in the object area of the first projection dataset and adapted based on a second projection value of the second projection dataset and as a function of a measure of influence of the first projection value by the artifact, and
create the second artifact-reduced x-ray image dataset based on the third projection dataset, the second artifact-reduced x-ray image dataset being provided based on the third projection dataset, and wherein
a respective projection of the plurality of projections corresponds to an irradiation of the examination object with x-ray radiation from a projection direction,
the object is an asymmetrical object, the asymmetrical object including a longitudinal extent and a transverse extent, a maximum of the transverse extent is less than or equal to 30% of a maximum of the longitudinal extent, and the object is in the examination object such that a majority of the longitudinal extent overlaps with the projection direction.

15. The method of claim 2, wherein the identifying of the object area is based on an application of a trained function.

16. The method of claim 2, further comprising:
determining an object image dataset based on the artifact-affected x-ray image dataset or the first artifact-reduced x-ray image dataset, the object image data set including image information of the object, and wherein the identifying includes identifying the object area based on the object image dataset.

17. The method of claim 16, wherein the determining of the object image dataset includes segmenting the object in the first artifact-reduced x-ray image dataset or segmenting the object in the artifact-affected x-ray image dataset.

18. The method of claim 9, wherein the artifact image dataset is applied to the artifact-affected x-ray image dataset to filter the artifact-affected x-ray image dataset via an image filter.

19. A non-transitory computer-readable storage medium, storing program sections readable and executable by a processor, to carry out the method of claim 2 when the program sections are executed by the processor.

* * * * *